US012506679B2

(12) United States Patent
Hao et al.

(10) Patent No.: US 12,506,679 B2
(45) Date of Patent: Dec. 23, 2025

(54) PACKET FORWARDING METHOD AND APPARATUS, AND DRAGONFLY NETWORK

(71) Applicant: Huawei Technologies Co., Ltd., Shenzhen (CN)

(72) Inventors: Weiguo Hao, Nanjing (CN); Jun Li, Nanjing (CN); Huafeng Wen, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 74 days.

(21) Appl. No.: 18/413,963

(22) Filed: Jan. 16, 2024

(65) Prior Publication Data
US 2024/0223495 A1 Jul. 4, 2024

Related U.S. Application Data

(63) Continuation of application No. PCT/CN2022/098019, filed on Jun. 10, 2022.

(30) Foreign Application Priority Data

Sep. 28, 2021 (CN) .......................... 202111142613.5

(51) Int. Cl.
H04L 45/125 (2022.01)
H04L 45/00 (2022.01)
H04L 45/42 (2022.01)

(52) U.S. Cl.
CPC ............ H04L 45/125 (2013.01); H04L 45/42 (2013.01); H04L 45/566 (2013.01)

(58) Field of Classification Search
CPC ...... H04L 45/125; H04L 45/42; H04L 45/566
See application file for complete search history.

(56) References Cited

U.S. PATENT DOCUMENTS

| 10,404,598 | B1* | 9/2019 | Sinn ......................... H04L 45/54 |
| 2012/0144064 | A1* | 6/2012 | Parker ................ H04Q 11/0005 |
| | | | 709/241 |
| 2015/0372916 | A1 | 12/2015 | Haramaty et al. |
| 2016/0012004 | A1* | 1/2016 | Arimilli .............. G06F 13/4221 |
| | | | 710/306 |
| 2019/0097935 | A1* | 3/2019 | Flajslik ............... H04L 43/0894 |
| 2022/0417163 | A1* | 12/2022 | Muntz ..................... H04L 12/44 |

FOREIGN PATENT DOCUMENTS

| CN | 111711565 A | 9/2020 |
| EP | 2451127 A1 | 5/2012 |

OTHER PUBLICATIONS

John Kim et al, "Technology-Driven, Highly-Scalable Dragonfly Topology", 2008 International Symposium on Computer Architecture, Jun. 21-25, 2008, total 12 pages.

* cited by examiner

Primary Examiner — Glenton B Burgess
Assistant Examiner — Jihad K Boustany
(74) Attorney, Agent, or Firm — Slater Matsil, LLP

(57) ABSTRACT

A first network device in a first device group receives a first packet that is sent by a first terminal device connected to the first network device and whose destination address is an IP address of a second terminal device connected to a second network device in a second device group. When a first inter-group interconnection link exists between the first network device and the second device group, and congestion does not occur on the first inter-group interconnection link, the first network device sends the first packet to the second network device through the first inter-group interconnection link.

20 Claims, 4 Drawing Sheets

PACKET FORWARDING METHOD AND APPARATUS, AND DRAGONFLY NETWORK

CROSS-REFERENCE TO RELATED APPLICATIONS

This application is a continuation of International Application No. PCT/CN2022/098019, filed on Jun. 10, 2022, which claims priority to Chinese Patent Application No. 202111142613.5, filed on Sep. 28, 2021. The disclosures of the aforementioned applications are hereby incorporated by reference in their entireties.

TECHNICAL FIELD

This application relates to the field of communication technologies, and in particular, to a packet forwarding method and apparatus, and a dragonfly network.

BACKGROUND

A dragonfly network is a frequently-used high-efficient communication system in a high performance computing (HPC) domain. Compared with networking topologies such as a fat tree network, the dragonfly network is featured in a short communication path, a low delay, a large networking scale, and the like, and can implement low-delay and high-throughput communication.

The dragonfly network includes a plurality of device groups, and each device group includes a plurality of network devices. Each network device includes a global interface, a local interface, and an access interface. The global interface is used for inter-group interconnection, the local interface is used for intra-group interconnection, and the access interface is used to be connected to terminal devices such as a server, a virtual machine (VM), and a storage device. All network devices in each device group are directly connected (namely, fully directly connected) in a mesh manner through the local interface. One device group may be considered as one logical device. Different device groups are directly connected in a mesh manner through the global interface.

Currently, the dragonfly network usually performs packet forwarding through adaptive routing, to achieve two objectives such as a low delay and a high throughput. When network devices in different device groups perform inter-group communication, if congestion does not occur on a shortest inter-group path, the shortest inter-group path is preferentially selected for packet forwarding, to implement the low delay; or if congestion occurs on a shortest inter-group path, a non-shortest inter-group path is selected for forwarding, to implement the high throughput. The shortest inter-group path is a packet forwarding path that passes through only one inter-group interconnection link. The non-shortest inter-group path is a packet forwarding path that passes through only one intermediate device group and two inter-group interconnection links. In other words, a packet forwarding path that passes through only one intermediate device group is referred to as the non-shortest inter-group path.

However, when there are a plurality of inter-group interconnection links between different device groups, there may be a plurality of cases of the shortest inter-group path: The shortest inter-group path includes only one inter-group interconnection link; the shortest inter-group path includes one inter-group interconnection link and one intra-group interconnection link in a source device group or a destination device group; and the shortest inter-group path includes one intra-group interconnection link in the source device group, one inter-group interconnection link, and one intra-group interconnection link in the destination device group. In a current packet forwarding manner, only the shortest inter-group path may be preferentially selected, and consequently control precision of the packet forwarding path is low.

SUMMARY

This application provides a packet forwarding method and apparatus, and a dragonfly network, to resolve a problem that current control precision of a packet forwarding path is low.

According to a first aspect, a packet forwarding method is provided. The method is applied to a dragonfly network, where the dragonfly network includes a plurality of device groups, and there are a plurality of inter-group interconnection links between different device groups. A first network device receives a first packet sent by a first terminal device connected to the first network device. A destination address of the first packet is an internet protocol (IP) address of a second terminal device connected to a second network device, the first network device belongs to a first device group, and the second network device belongs to a second device group. When a first inter-group interconnection link exists between the first network device and the second device group, and congestion does not occur on the first inter-group interconnection link, the first network device sends the first packet to the second network device through the first inter-group interconnection link.

In this application, the first network device preferentially selects an inter-group interconnection link between the first network device and the second device group to send a packet to the second network device, so that a forwarding hop count of the packet is as small as possible, to implement a low delay of inter-group communication, and improve control precision of a packet forwarding path.

Optionally, the first network device determines, based on a congestion state of a global interface that is on the first network device and that is connected to the second device group, whether congestion occurs on the first inter-group interconnection link.

Optionally, when congestion occurs on the first inter-group interconnection link, or an inter-group interconnection link does not exist between the first network device and the second device group, the first network device sequentially performs congestion determining on a shortest intra-group bypass path, a local non-shortest direct-connected path, and a non-shortest intra-group bypass path between the first network device and the second network device until a target forwarding path is obtained. The first network device sends to the second network device through the target forwarding path, a second packet obtained based on the first packet. The shortest intra-group bypass path includes an intra-group interconnection link between the first network device and a third network device in the first device group and an inter-group interconnection link between the third network device and the second device group, the local non-shortest direct-connected path includes an inter-group interconnection link between the first network device and a third device group and an inter-group interconnection link between the third device group and the second device group, and the non-shortest intra-group bypass path includes an intra-group interconnection link between the first network device and a fourth network device in the first device group, an inter-group interconnection link between the fourth network device and a fourth device group, and an inter-group interconnection link between the fourth device group and the second device group.

In this application, when selecting a path, the first network device follows a principle of preferentially selecting a shortest inter-group path, and then selecting a non-shortest inter-group path after congestion occurs on all shortest inter-group paths. In addition, the first network device preferentially selects a local shortest direct-connected path when selecting a forwarding path from the shortest inter-group path, and preferentially selects the local non-shortest direct-connected path when selecting a forwarding path from the non-shortest inter-group path. This may reduce a packet forwarding delay as much as possible, and a local direct-connected path may be preferentially selected. The first network device may better sense a local congestion condition in real time, and subsequently determine, based on the local congestion condition, whether to switch a path, so that a path switching occasion may be determined more accurately.

Optionally, that the first network device sequentially performs congestion determining on a shortest intra-group bypass path, a local non-shortest direct-connected path, and a non-shortest intra-group bypass path between the first network device and the second network device until a target forwarding path is obtained includes: The first network device performs congestion determining on the shortest intra-group bypass path between the first network device and the second network device. When the shortest intra-group bypass path on which congestion does not occur exists between the first network device and the second network device, the first network device uses, as the target forwarding path, any shortest intra-group bypass path on which congestion does not occur between the first network device and the second network device. When the shortest intra-group bypass path on which congestion does not occur does not exist between the first network device and the second network device, the first network device performs congestion determining on the local non-shortest direct-connected path between the first network device and the second network device. When the local non-shortest direct-connected path on which congestion does not occur exists between the first network device and the second network device, the first network device uses, as the target forwarding path, any local non-shortest direct-connected path on which congestion does not occur between the first network device and the second network device. When the local non-shortest direct-connected path on which congestion does not occur does not exist between the first network device and the second network device, the first network device performs congestion determining on the non-shortest intra-group bypass path between the first network device and the second network device. When the non-shortest intra-group bypass path on which congestion does not occur exists between the first network device and the second network device, the first network device uses, as the target forwarding path, any non-shortest intra-group bypass path on which congestion does not occur between the first network device and the second network device.

Optionally, an implementation in which the first network device performs congestion determining on the shortest intra-group bypass path between the first network device and the second network device includes: The first network device determines based on a queue depth of a first outbound interface queue of a local interface that is on the first network device and that is connected to the third network device and a congestion state of a global interface that is on the third network device and that is connected to the second device group, whether congestion occurs on the shortest intra-group bypass path that is between the first network device and the second network device and that passes through the third network device, where the first outbound interface queue is used to forward a packet that is in the first network device and that is forwarded through the shortest intra-group bypass path.

Optionally, an implementation in which the first network device performs congestion determining on the local non-shortest direct-connected path between the first network device and the second network device includes: The first network device determines, based on a congestion state of a global interface that is on the first network device and that is connected to the third device group, whether congestion occurs on the local non-shortest direct-connected path that is between the first network device and the second network device and that passes through the third device group.

Optionally, an implementation in which the first network device performs congestion determining on the non-shortest intra-group bypass path between the first network device and the second network device includes: The first network device determines based on a queue depth of a second outbound interface queue of a local interface that is on the first network device and that is connected to the fourth network device and a congestion state of a global interface that is on the fourth network device and that is connected to the fourth device group, whether congestion occurs on the non-shortest intra-group bypass path that is between the first network device and the second network device and that passes through the fourth network device and the fourth device group, where the second outbound interface queue is used to forward a packet that is in the first network device and that is forwarded through the non-shortest intra-group bypass path.

When the first network device selects the shortest intra-group bypass path or the non-shortest intra-group bypass path, the first network device needs to forward a packet through another network device in the first device group. Regardless of whether the first network device selects the shortest intra-group bypass path or the non-shortest intra-group bypass path, if a same network device in the first device group is used to forward a packet, local interfaces used to send a packet are the same. Therefore, a quantity of packets that are sent from a same local interface and that are on the shortest intra-group bypass path and a quantity of packets that are sent on the non-shortest intra-group bypass path need to be distinguished, to separately determine congestion conditions of the shortest intra-group bypass path and the non-shortest intra-group bypass path. In this application, the outbound interface queue of the local interface is divided into a first outbound interface queue and a second outbound interface queue. The first outbound interface queue is used to forward a packet that is in the first network device and that is forwarded through the shortest intra-group bypass path, and the second outbound interface queue is used to forward a packet that is in the first network device and that is forwarded through the non-shortest intra-group bypass path, so that a congestion condition of the shortest intra-group bypass path is determined based on the queue depth of the first outbound interface queue, and a congestion condition of the non-shortest intra-group bypass path is determined based on the queue depth of the second outbound interface queue.

Optionally, an implementation in which the first network device sends to the second network device through the target forwarding path, a second packet obtained based on the first packet includes: When the target forwarding path is the shortest intra-group bypass path, the first network device adds a first indication to the first packet to obtain the second packet, and sends the second packet to the second network device through the target forwarding path, where the first indication indicates that a forwarding path type is the shortest intra-group bypass path. Alternatively, when the target forwarding path is the non-shortest intra-group bypass path, the first network device adds a second indication to the first packet to obtain the second packet, and sends the second packet to the second network device through the target forwarding path, where the second indication indicates that a forwarding path type is the non-shortest intra-group bypass path.

In this application, when the first network device selects the shortest intra-group bypass path or the non-shortest intra-group bypass path, the first network device needs to forward a packet through another network device in the first device group. Regardless of whether the first network device selects the shortest intra-group bypass path or the non-shortest intra-group bypass path, if a same network device in the first device group is used to forward a packet, local interfaces used by the network device to receive the packet are the same. Therefore, the network device needs to distinguish which packets in the packets received from the local interface that pass through the shortest intra-group bypass path, and which packets pass through the non-shortest intra-group bypass path, so that a corresponding forwarding path is used to forward the packet. In this application, a source network device adds a first indication to the packet that passes through the shortest intra-group bypass path, and adds a second indication to the packet that passes through the non-shortest intra-group bypass path, to clearly indicate a forwarding path used by another network device that forwards the packet in the device group to forward the packet. In this way, the another network device may learn, based on the indication in the packet, that the packet should be forwarded through which global interface, to improve packet forwarding efficiency.

Optionally, the first network device obtains a routing and forwarding table, where the routing and forwarding table includes a routing prefix table and a plurality of equal-cost multi-path (ECMP) group tables. Each entry in the routing prefix table includes a correspondence between a destination IP address and a group index of a destination device group. The group index of the destination device group is associated with one ECMP group table, the ECMP group table includes an outbound interface corresponding to each path from the first network device to the destination device group, and the destination device group is a device group in which an access device of a terminal device to which a corresponding destination IP address belongs is located.

In this application, the network device stores, by using a routing prefix table in combination with the ECMP group table, a route to each terminal device, and may store, by using one ECMP group table, all forwarding information corresponding to an IP address of a terminal device that accesses a same device group. This may save entry resources.

Optionally, the ECMP group table includes a first routing subtable and a second routing subtable. The first routing subtable includes an outbound interface corresponding to each path from the first network device to the destination device group, and the first routing subtable is used by the first network device to forward a packet from a terminal device accessing the first device group. The second routing subtable includes an outbound interface corresponding to a shortest inter-group path from the first network device to the destination device group, and the second routing subtable is used by the first network device to forward a packet from a terminal device accessing a device group other than the first device group.

In this application, when the first network device is located in an intermediate device group or a destination device group, the first network device forwards the packet based on the second routing subtable. In other words, the first network device forwards the packet by using a shortest path algorithm, so that a routing loop may be avoided.

In an implementation, each device group corresponds to one autonomous system (AS) number. A process in which the first network device obtains a routing and forwarding table includes: When the first network device receives a first routing message, and an AS-path attribute of the first routing message includes only one AS number, the first network device adds a forwarding entry obtained based on the first routing message to each of the first routing subtable and the second routing subtable. When the first network device receives a second routing message, and an AS-path attribute of the second routing message includes two AS numbers, the first network device adds a forwarding entry obtained based on the second routing message to only the first routing subtable.

In another implementation, a process in which the first network device obtains a routing and forwarding table includes: The first network device generates the routing prefix table and the plurality of ECMP group tables based on a networking topology of the dragonfly network, an IP address of a terminal device accessing the dragonfly network, and an access device of the terminal device.

In still another implementation, a process in which the first network device obtains a routing and forwarding table includes: The first network device receives the routing and forwarding table sent by a control device.

According to a second aspect, a packet forwarding apparatus is provided. The apparatus is applied to a first network device in a dragonfly network, where the dragonfly network includes a plurality of device groups, and there are a plurality of inter-group interconnection links between different device groups. The apparatus includes a plurality of functional modules, and the plurality of functional modules interact with each other, to implement the method in the first aspect and the implementations of the first aspect. The plurality of functional modules may be implemented based on software, hardware, or a combination of software and hardware, and the plurality of functional modules may be randomly combined or divided based on specific implementation.

According to a third aspect, a dragonfly network is provided, including: a plurality of device groups, where there are a plurality of inter-group interconnection links between different device groups, and a network device in the device group is configured to perform the method in the first aspect and implementations of the first aspect.

According to a fourth aspect, a network device is provided, including: a processor and a memory, where the memory is configured to store a computer program, where the computer program includes program instructions; and the processor is configured to invoke the computer program, to implement the method in the first aspect and implementations of the first aspect.

According to a fifth aspect, a computer-readable storage medium is provided, where the computer-readable storage medium stores instructions; and when the instructions are executed by a processor, the method in the first aspect and implementations of the first aspect are implemented.

According to a sixth aspect, a computer program product is provided, including a computer program. When the computer program is executed by a processor, the method in the first aspect and implementations of the first aspect are implemented.

According to a seventh aspect, a chip is provided. The chip includes a programmable logic circuit and/or program instructions. When the chip runs, the method in the first aspect and implementations of the first aspect are implemented.

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

Figure 1:
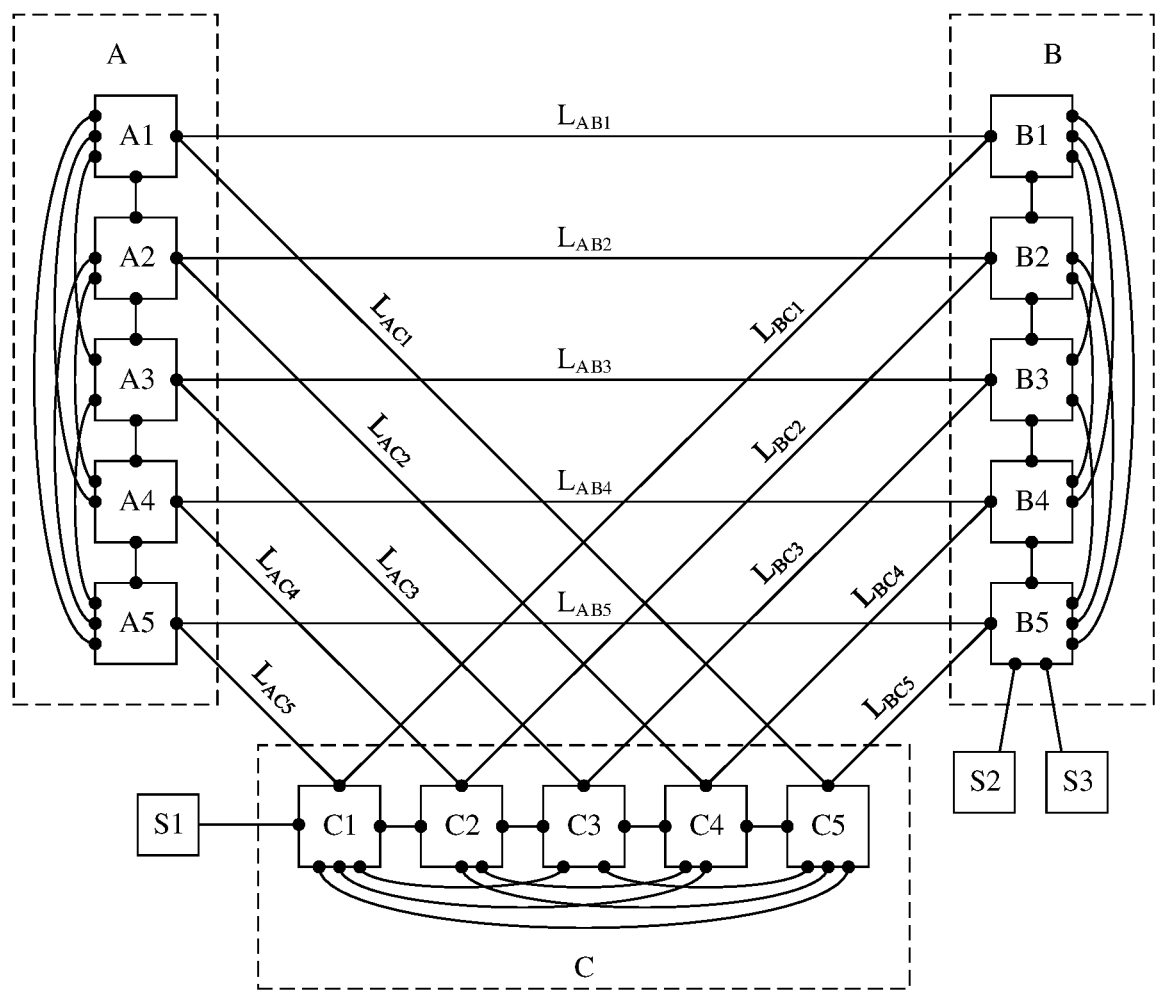
FIG. 1 is a schematic diagram of a structure of a dragonfly network according to an embodiment of this application.

The packet forwarding method provided in embodiments of this application is applied to a dragonfly network. The dragonfly network includes a plurality of device groups, and there are a plurality of inter-group interconnection links between different device groups. A plurality of inter-group interconnection links between two device groups are usually distributed on different network devices. For example, FIG. 1 is a schematic diagram of a structure of a dragonfly network according to an embodiment of this application. As shown in FIG. 1, the dragonfly network includes a device group A, a device group B, and a device group C. The device group A includes five network devices A1 to A5, the device group B includes five network devices B1 to B5, and the device group C includes five network devices C1 to C5. Optionally, the network device may be a router, a switch, or the like. A quantity of device groups and a quantity of network devices in each device group in FIG. 1 are merely used as an example, and are not used as a limitation on the dragonfly network provided in embodiments of this application.

After a networking plan is determined, an interface role may be configured for each network device in the dragonfly network. Specifically, interfaces on the network device may be classified into a global interface, a local interface, and an access interface. The global interface is used for inter-group interconnection. The local interface is used for intra-group interconnection. The access interface is used to be connected to the terminal device. The terminal device may be, for example, a server, a VM, a storage device, or the like. A ratio of the global interface, the local interface, and the access interface on the network device is 1:2:1. For example, in the dragonfly network shown in FIG. 1, each network device has eight interfaces GE 1 to GE 8 (not shown in the figure). Two interfaces (GE 1 and GE 2) are access interfaces, four interfaces (GE 3, GE 4, GE 5, and GE 6) are local interfaces, and two interfaces (GE 7 and GE 8) are global interfaces.

Optionally, an interface of the network device may be used as an inbound interface to receive a packet, or may be used as an outbound interface to send a packet. A congestion state of the interface of the network device described in this application is a congestion state when the interface is used as the outbound interface. In an implementation, the congestion state of the interface may be determined based on a queue depth of an outbound interface queue of the interface. If a queue depth of at least one outbound interface queue of an interface exceeds a first threshold, it is determined that congestion occurs on the interface; or if queue depths of all outbound interface queues of an interface do not exceed a first threshold, it is determined that congestion does not occur on the interface. In another implementation, the congestion state of the interface may also be determined based on bandwidth utilization of the interface. If a bandwidth utilization rate of an interface exceeds a second threshold, it is determined that congestion occurs on the interface; or if a bandwidth utilization rate of an interface does not exceed a second threshold, it is determined that congestion does not occur on the interface. The bandwidth utilization rate of the interface is equal to a ratio of a packet sending rate of the interface to a bandwidth allocated to the interface. In embodiments of this application, the congestion state of the interface may be classified into two types: a congested state and a non-congested state, or the congestion state of the interface may be classified into three types: a non-congested state (namely, light load), a moderately congested state, and a heavily congested state. This is not limited in embodiments of this application.

In the dragonfly network shown in FIG. 1, a plurality of network devices in each device group are directly connected in a mesh manner through four local interfaces. There are five inter-group interconnection links between different device groups. For example, the five inter-group interconnection links between the device group A and the device group B respectively include: an inter-group interconnection link $L_{AB1}$ between a network device A1 and a network device B1, an inter-group interconnection link $L_{AB2}$ between a network device A2 and a network device B2, an inter-group interconnection link $L_{AB3}$ between a network device A3 and a network device B3, an inter-group interconnection link $L_{AB4}$ between a network device A4 and a network device B4, and an inter-group interconnection link $L_{AB5}$ between a network device A5 and a network device B5. The five inter-group interconnection links between the device group A and the device group C respectively include: an inter-group interconnection link $L_{AC1}$ between a network device A1 and a network device C5, an inter-group interconnection link $L_{AC2}$ between a network device A2 and a network device C4, an inter-group interconnection link $L_{AC3}$ between a network device A3 and a network device C3, an inter-group interconnection link $L_{AC4}$ between a network device A4 and a network device C2, and an inter-group interconnection link $L_{AC5}$ between a network device A5 and a network device C1. The five inter-group interconnection links between the device group B and the device group C respectively include: an inter-group interconnection link $L_{BC1}$ between a network device B1 and a network device C1, an inter-group interconnection link $L_{BC2}$ between a network device B2 and a network device C2, an inter-group interconnection link $L_{BC3}$ between a network device B3 and a network device C3, an inter-group interconnection link $L_{BC4}$ between a network device B4 and a network device C4, and an inter-group interconnection link $L_{BC5}$ between a network device B5 and a network device C5.

In embodiments of this application, a shortest inter-group path between two device groups is classified into a local shortest direct-connected path and a shortest intra-group bypass path, and/or a non-shortest inter-group path between two device groups is classified into a local non-shortest direct-connected path and a non-shortest intra-group bypass path. A difference between the local shortest direct-connected path and the non-shortest intra-group bypass path is that the local shortest direct-connected path does not include an intra-group interconnection link in the source device group, and the shortest intra-group bypass path includes one intra-group interconnection link in the source device group. A difference between the local non-shortest direct-connected path and the non-shortest intra-group bypass path is that the local non-shortest direct-connected path does not include an intra-group interconnection link in the source device group, and the non-shortest intra-group bypass path includes one intra-group interconnection link in the source device group.

The source device group refers to a device group in which an access device (referred to as a source network device below) of a source terminal device that sends a packet is located. The destination device group refers to a device group in which an access device (referred to as a destination network device below) of a destination terminal device that receives a packet is located. For example, still referring to FIG. 1, a terminal device S1 is connected to a network device C1, a terminal device S2 is connected to a network device B5, and a terminal device S3 is connected to the network device B5. It is assumed that the terminal device S1 is the source terminal device, the network device C1 is the source network device, and the device group C is the source device group. It is assumed that the terminal device S2 is the destination terminal device, the network device B5 is the destination network device, and the device group B is the destination device group.

When network devices in different device groups perform inter-group communication, and there is an inter-group interconnection link between the source network device and the destination device group, the source network device may select, in descending order of priorities, a local shortest direct-connected path, a shortest intra-group bypass path, a local non-shortest direct-connected path, and a non-congestion path in the non-shortest intra-group bypass path, to forward a packet from the terminal device connected to the source network device. When there is not an inter-group interconnection link between the source network device and the destination device group, the source network device may select, in descending order of priorities, a shortest intra-group bypass path, a local non-shortest direct-connected path, and a non-congestion path in the non-shortest intra-group bypass path, to forward a packet from the terminal device connected to the source network device.

In an implementation, when an inter-group interconnection link exists between the source network device and the destination device group, and congestion does not occur on the inter-group interconnection link, the source network device sends a packet from the source terminal device through the inter-group interconnection link. For example, in the dragonfly network shown in FIG. 1, the terminal device S1 is the source terminal device, and the terminal device S2 is the destination terminal device. If congestion does not occur on the inter-group interconnection link $L_{BC1}$ between the network device C1 and the network device B1, the network device C1 sends, to the network device B1 through the inter-group interconnection link $L_{BC1}$, a packet from the terminal device S1 and whose destination address is the terminal device S2.

The local shortest direct-connected path includes the inter-group interconnection link between the source network device and the destination device group. The source network device sends a packet from the source terminal device through the inter-group interconnection link between the source network device and the destination device group. In other words, the source network device sends the packet from the source terminal device through the local shortest direct-connected path. For example, a local shortest direct-connected path between the network device C1 and the network device B5 includes the inter-group interconnection link $L_{BC1}$ between the network device C1 and the network device B1 and an intra-group interconnection link between the network device B1 and the network device B5.

The shortest intra-group bypass path includes an intra-group interconnection link between the source network device and another network device in the source device group and an inter-group interconnection link between the another network device and the destination device group. For example, one shortest intra-group bypass path between the network device C1 and the network device B5 includes an intra-group interconnection link between the network device C1 and the network device C5 and an inter-group interconnection link $L_{BC5}$ between the network device C5 and the network device B5.

The local non-shortest direct-connected path includes an inter-group interconnection link between the source network device and another device group other than the destination device group and one inter-group interconnection link between the another device group and the destination device group. For example, a local non-shortest direct-connected path between the network device C1 and the network device B5 includes an inter-group interconnection link LACS between the network device C1 and the network device A5 and an inter-group interconnection link $L_{AB5}$ between the network device A5 and the network device B5.

The non-shortest intra-group bypass path includes the intra-group interconnection link between the source network device and the another network device in the source device group, the inter-group interconnection link between the another network device and another device group other than the destination device group, and one inter-group interconnection link between the another device group and the destination device group. For example, one non-shortest intra-group bypass path between the network device C1 and the network device B5 includes an intra-group interconnection link between the network device C1 and the network device C2, the inter-group interconnection link $L_{AC4}$ between the network device C2 and the network device A4, the inter-group interconnection link $L_{AB4}$ between the network device A4 and the network device B4, and an intra-group interconnection link between the network device B4 and the network device B5.

In embodiments of this application, that congestion does not occur on a forwarding path means that congestion does not occur on a link associated with the source device group on the forwarding path. The link associated with the source device group may include the intra-group interconnection link in the source device group and the inter-group interconnection link between the source device group and another device group. For example, if congestion does not occur on the inter-group interconnection link between the source network device and the destination device group, it is determined that congestion does not occur on the local shortest direct-connected path. If congestion does not occur on the intra-group interconnection link between the source network device and the another network device in the source device group, and congestion does not occur on the inter-group interconnection link between the another network device and the destination device group, it is determined that congestion does not occur on the shortest intra-group bypass path that passes through the another network device. If congestion does not occur on an inter-group interconnection link between the source network device and another device group other than the destination device group, it is determined that congestion does not occur on a local non-shortest direct-connected path that passes through the another device group. If congestion does not occur on the intra-group interconnection link between the source network device and the another network device in the source device group, and congestion does not occur on the inter-group interconnection link between the another network device and another device group other than the destination device group, it is determined that congestion does not occur on a non-shortest intra-group bypass path that passes through the another network device and the another device group.

In embodiments of this application, the shortest inter-group path is divided into the local shortest direct-connected path and the shortest intra-group bypass path, and/or the non-shortest inter-group path is divided into the local non-shortest direct-connected path and the non-shortest intra-group bypass path, so that the source network device may select a path at a finer granularity, to implement fine control on a packet forwarding path, and accurately control a low delay and a high throughput of packet forwarding. In addition, when selecting a path, the source network device follows a principle of preferentially selecting a shortest inter-group path, and then selecting a non-shortest inter-group path after congestion occurs on all shortest inter-group paths. In addition, the first network device preferentially selects a local shortest direct-connected path when selecting a forwarding path from the shortest inter-group path, and preferentially selects a local non-shortest direct-connected path when selecting a forwarding path from the non-shortest inter-group path. This may reduce a packet forwarding delay as much as possible, and a local direct-connected path may be preferentially selected. The source network device may better sense a local congestion condition in real time, and subsequently determine, based on the local congestion condition, whether to switch a path, so that a path switching occasion may be determined more accurately.

The following describes a method procedure provided in embodiments of this application by using an example.

Figure 2A:
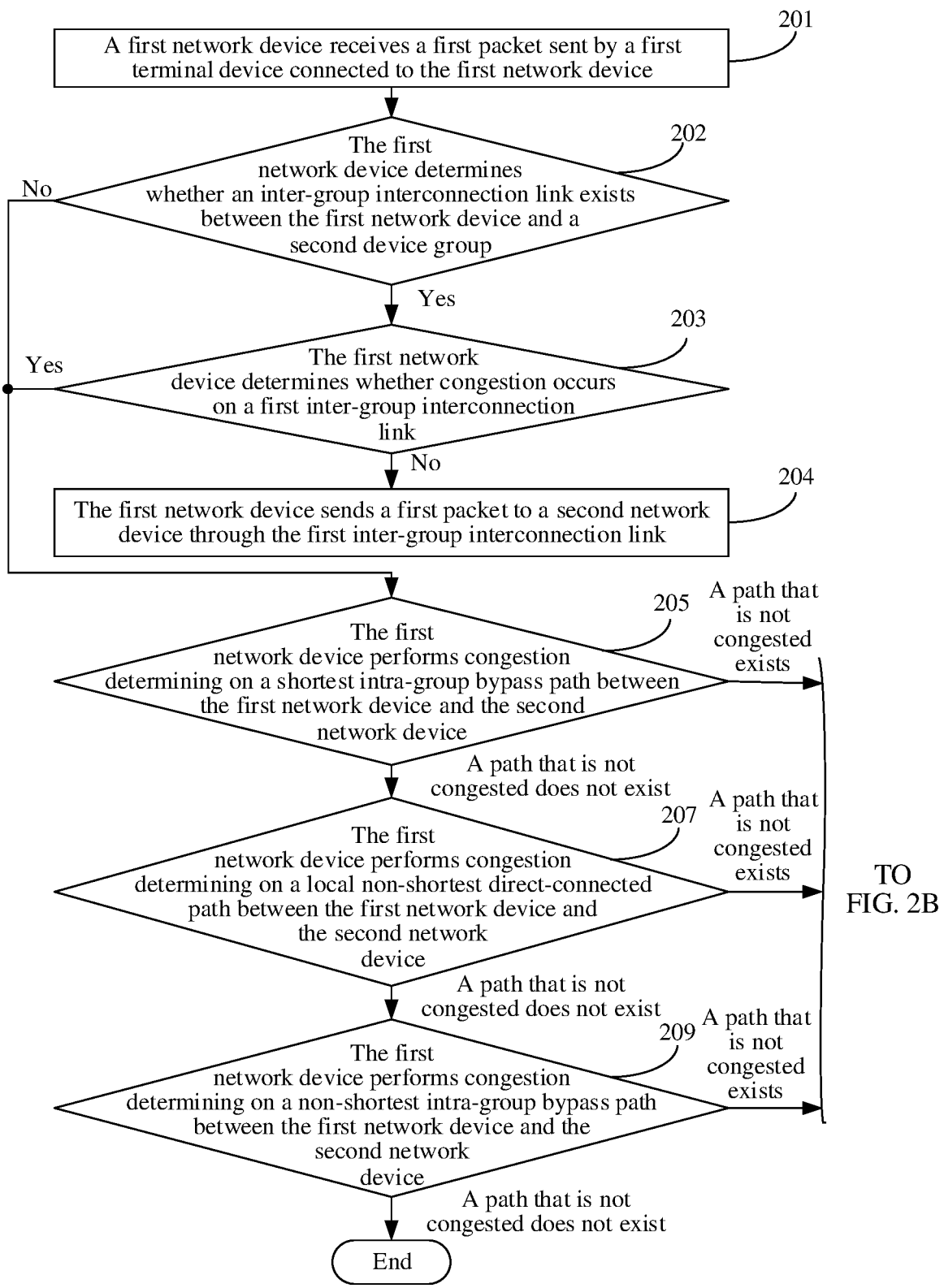
FIG. 2A and FIG. 2B are schematic flowcharts of a packet forwarding method according to an embodiment of this application.
Figure 2B:
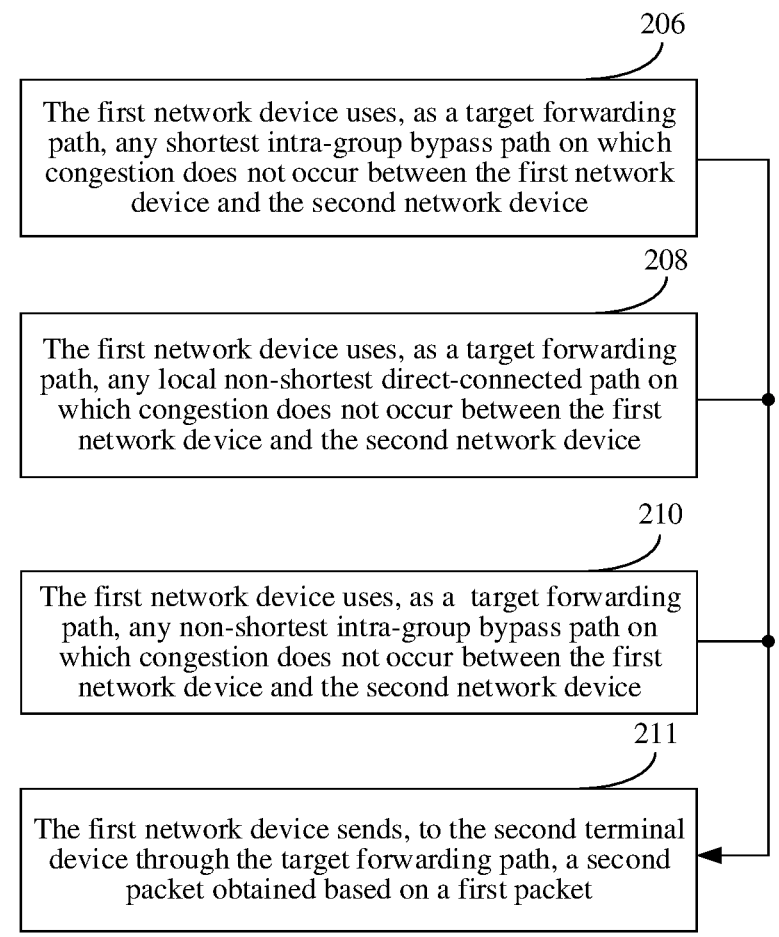

For example, FIG. 2A and FIG. 2B are schematic flowcharts of a packet forwarding method according to an embodiment of this application. The method may be applied to the dragonfly network shown in FIG. 1. As shown in FIG. 2A and FIG. 2B, this method includes the following steps.

Step 201: A first network device receives a first packet sent by a first terminal device connected to the first network device.

A destination address of the first packet is an IP address of a second terminal device connected to a second network device, the first network device belongs to a first device group, and the second network device belongs to a second device group. There are a plurality of inter-group interconnection links between the first device group and the second device group.

For example, in the dragonfly network shown in FIG. 1, the first terminal device is a terminal device S1, and the second terminal device is a terminal device S2. In this case, the first network device is a network device C1, the first device group is a device group C, the second network device is a network device B5, and the second device group is a device group B.

Step 202: The first network device determines whether an inter-group interconnection link exists between the first network device and a second device group; and performs step 203 if a first inter-group interconnection link exists between the first network device and the second device group; or performs step 205 if the inter-group interconnection link does not exist between the first network device and the second device group.

Although there are a plurality of inter-group interconnection links between the first device group and the second device group, an inter-group interconnection link may exist between the first network device and the second device group, or an inter-group interconnection link may not exist between the first network device and the second device group.

The first network device determines whether the inter-group interconnection link exists between the first network device and the second device group, to be specific, determines whether a local shortest direct-connected path exists between the first network device and the second device group.

Step 203: The first network device determines whether congestion occurs on a first inter-group interconnection link; and performs step 204 if congestion does not occur on the first inter-group interconnection link; or performs step 205 if congestion occurs on the first inter-group interconnection link.

The first network device determines whether congestion occurs on the first inter-group interconnection link, that is, performs congestion determining on the local shortest direct-connected path between the first network device and the second device group. Optionally, the first network device determines, based on a congestion state of a global interface that is on the first network device and that is connected to the second device group, whether congestion occurs on the first inter-group interconnection link. If congestion occurs on a global interface that is on the first network device and that is connected to the second device group, the first network device determines that congestion occurs on the first inter-group interconnection link; or if congestion does not occur on the global interface that is on the first network device and that is connected to the second device group, the first network device determines that congestion does not occur on the first inter-group interconnection link.

With reference to the example in step 201, it is assumed that a network device C1 is connected to a network device B1 through a global interface GE 8. If congestion occurs on the global interface GE 8 of the network device C1, it is determined that congestion occurs on an inter-group interconnection link $L_{BC_1}$ between the network device C1 and the network device B1; or if congestion does not occur on the global interface GE 8 of the network device C1, it is determined that congestion does not occur on the inter-group interconnection link $L_{BC_1}$ between the network device C1 and the network device B1.

Step 204: The first network device sends a first packet to a second network device through the first inter-group interconnection link.

The first network device sends the first packet to the second network device through the first inter-group interconnection link, to be specific, sends the first packet to the second network device through the local shortest direct-connected path.

In embodiments of this application, a source network device preferentially selects the local shortest direct-connected path to send a packet to a destination network device, so that a forwarding hop count of the packet is as small as possible, to implement a low delay of inter-group communication.

Step 205: The first network device performs congestion determining on a shortest intra-group bypass path between the first network device and the second network device; and performs step 206 if the shortest intra-group bypass path on which congestion does not occur exists between the first network device and the second network device; or performs step 207 if the shortest intra-group bypass path on which congestion does not occur does not exist between the first network device and the second network device.

Optionally, the first network device determines based on a queue depth of a first outbound interface queue of a local interface that is on the first network device and that is connected to a third network device and a congestion state of a global interface that is on the third network device and that is connected to the second device group, whether congestion occurs on the shortest intra-group bypass path that is between the first network device and the second network device and that passes through the third network device. If the queue depth of the first outbound interface queue of the local interface that is on the first network device and that is connected to the third network device exceeds a first threshold, and/or congestion occurs on the global interface that is on the third network device and that is connected to the second device group, it is determined that congestion occurs on the shortest intra-group bypass path that is between the first network device and the second network device and that passes through the third network device. If the queue depth of the first outbound interface queue of the local interface that is on the first network device and that is connected to the third network device does not exceed the first threshold, and congestion does not occur on the global interface that is on the third network device and that is connected to the second device group, it is determined that congestion does not occur on the shortest intra-group bypass path that is between the first network device and the second network device and that passes through the third network device.

The first outbound interface queue is used to forward a packet that is in the first network device and that is forwarded through the shortest intra-group bypass path. When the first network device selects the shortest intra-group bypass path or the non-shortest intra-group bypass path, the first network device needs to forward a packet through another network device in the first device group. Regardless of whether the first network device selects the shortest intra-group bypass path or the non-shortest intra-group bypass path, if a same network device in the first device group is used to forward a packet, local interfaces used to send a packet are the same. Therefore, a quantity of packets that are sent from a same local interface and that are on the shortest intra-group bypass path and a quantity of packets that are sent on the non-shortest intra-group bypass path need to be distinguished, to separately determine congestion conditions of the shortest intra-group bypass path and the non-shortest intra-group bypass path. In embodiments of this application, an outbound interface queue of the local interface is divided into a first outbound interface queue and a second outbound interface queue. The first outbound interface queue is used to forward a packet that is in the first network device and that is forwarded through the shortest intra-group bypass path, and the second outbound interface queue is used to forward a packet that is in the first network device and that is forwarded through the non-shortest intra-group bypass path, so that a congestion condition of the shortest intra-group bypass path is determined based on the queue depth of the first outbound interface queue, and a congestion condition of the non-shortest intra-group bypass path is determined based on the queue depth of the second outbound interface queue.

Optionally, the third network device is any network device, in the first device group, other than the first network device, that has an inter-group interconnection link with the second device group. With reference to the example in step 201, the third network device may be a network device C2, a network device C3, a network device C4, or a network device C5.

Optionally, a plurality of network devices belonging to a same device group notify each other of a congestion state of a global interface of the plurality of network devices. For example, the first network device may periodically or in real time send the congestion state of the global interface of the first network device to another network device in the first device group. The first network device may store a latest congestion state of each interface in the first network device and a latest congestion state of a global interface in another network device in the first device group. For example, the first network device is the network device C1 in FIG. 1, and a congestion state of each interface stored in the network device C1 at a moment may be shown in Table 1. "1" represents that congestion does not occur, and "2" represents that congestion occurs.

TABLE 1

|  | GE 1 | GE 2 | GE 3 | GE 4 | GE 5 | GE 6 | GE 7 | GE 8 |
| --- | --- | --- | --- | --- | --- | --- | --- | --- |
| Network device C1 | 1 | 1 | (1, 2) | (1, 1) | (2, 2) | (1, 1) | 1 | 1 |
| Network device C2 | / | / | / | / | / | / | 1 | 2 |
| Network device C3 | / | / | / | / | / | / | 2 | 1 |
| Network device C4 | / | / | / | / | / | / | 2 | 2 |
| Network device C5 | / | / | / | / | / | / | 1 | 1 |

Table 1 shows a congestion state (a, b) of each of local interfaces GE 3 to GE 6 of the network device C1, where a represents a congestion state of a first outbound interface queue used to forward a packet forwarded through a shortest intra-group bypass path in the network device C1, and b represents a congestion state of a second outbound interface queue used to forward a packet forwarded through a non-shortest intra-group bypass path in the network device C1.

Step 206: The first network device uses, as a target forwarding path, any shortest intra-group bypass path on which congestion does not occur between the first network device and the second network device.

Optionally, the first network device may separately perform congestion determining on all shortest intra-group bypass paths between the first network device and the second network device, and then randomly select, as the target forwarding path, one of the shortest intra-group bypass paths on which congestion does not occur between the first network device and the second network device. Alternatively, the first network device may sequentially perform congestion determining on the shortest intra-group bypass path between the first network device and the second network device, stop determining after obtaining the shortest intra-group bypass path on which congestion does not occur, and use, as the target forwarding path, the shortest intra-group bypass path on which congestion does not occur.

In the dragonfly network shown in FIG. 1, there are four shortest intra-group bypass paths between the network device C1 and the network device B5: the network device C1→the network device C2→the network device B2→the network device B5; the network device C1→the network device C3→the network device B3→the network device B5; the network device C1→the network device C4→the network device B4→the network device B5; and the network device C1→the network device C5→the network device B5.

Step 207: The first network device performs congestion determining on a local non-shortest direct-connected path between the first network device and the second network device; and performs step 208 if the local non-shortest direct-connected path on which congestion does not occur exists between the first network device and the second network device; or performs step 209 if the local non-shortest direct-connected path on which congestion does not occur does not exist between the first network device and the second network device.

Optionally, the first network device determines based on a congestion state of a global interface that is on the first network device and that is connected to the third device group, whether congestion occurs on the local non-shortest direct-connected path that is between the first network device and the second network device and that passes through the third device group. If congestion occurs on the global interface that is on the first network device and that is connected to the third device group, it is determined that congestion occurs on the local non-shortest direct-connected path that is between the first network device and the second network device and that passes through the third device group. If congestion does not occur on the global interface that is on the first network device and that is connected to the third device group, it is determined that congestion does not occur on the local non-shortest direct-connected path that is between the first network device and the second network device and that passes through the third device group.

Optionally, the third device group is any device group other than the first device group and the second device group in the dragonfly network. With reference to the example in step 201, the third device group is a device group A. It is assumed that a network device C1 is connected to a network device A5 through a global interface GE 7. If congestion occurs on the global interface GE 7 of the network device C1, it is determined that congestion occurs on an inter-group interconnection link $L_{AC5}$ between the network device C1 and the network device A5, and further, it is determined that congestion occurs on a local non-shortest direct-connected path between the network device C1 and the network device B5; or if congestion does not occur on the global interface GE 7 of the network device C1, it is determined that congestion does not occur on the inter-group interconnection link LACS between the network device C1 and the network device A5, and further, it is determined that congestion does not occur on the local non-shortest direct-connected path between the network device C1 and the network device B5

Step 208: The first network device uses, as the target forwarding path, any local non-shortest direct-connected path on which congestion does not occur between the first network device and the second network device.

Optionally, the first network device may separately perform congestion determining on all local non-shortest direct-connected paths between the first network device and the second network device, and then randomly select, as the target forwarding path, one of the local non-shortest direct-connected paths on which congestion does not occur between the first network device and the second network device. Alternatively, the first network device may sequentially perform congestion determining on the local non-shortest direct-connected path between the first network device and the second network device, stop determining after obtaining the local non-shortest direct-connected path on which congestion does not occur, and use, as the target forwarding path, the local non-shortest direct-connected path on which congestion does not occur.

In the dragonfly network shown in FIG. 1, there is only one local non-shortest direct-connected path between the network device C1 and the network device B5: the network device C1→the network device A5→the network device B5.

Step 209: The first network device performs congestion determining on a non-shortest intra-group bypass path between the first network device and the second network device; and performs step 210 if the non-shortest intra-group bypass path on which congestion does not occur exist between the first network device and the second network device; or ends a packet forwarding procedure if the non-shortest intra-group bypass path on which congestion does not occur does not exist between the first network device and the second network device.

Optionally, the first network device determines based on a queue depth of a second outbound interface queue of a local interface that is on the first network device and that is connected to the fourth network device and a congestion state of a global interface that is on the fourth network device and that is connected to the fourth device group, whether congestion occurs on the non-shortest intra-group bypass path that is between the first network device and the second network device and that passes through the fourth network device and the fourth device group. If the queue depth of the second outbound interface queue of the local interface that is on the first network device and that is connected to the fourth network device exceeds a first threshold, and/or congestion occurs on a global interface that is on the fourth network device and that is connected to the fourth device group, it is determined that congestion occurs on the non-shortest intra-group bypass path that is between the first network device and the second network device and that passes through the fourth network device and the fourth network device group. If the queue depth of the second outbound interface queue of the local interface that is on the first network device and that is connected to the fourth network device does not exceed the first threshold, and congestion does not occur on the global interface that is on the fourth network device and that is connected to the fourth device group, it is determined that congestion does not occur on the non-shortest intra-group bypass path that is between the first network device and the second network device and that passes through the fourth network device and the fourth network device group. The second outbound interface queue is used to forward a packet that is in the first network device and that is forwarded through the non-shortest intra-group bypass path.

Optionally, the fourth network device is any network device, in the first device group, other than the first network device, that has an inter-group interconnection link with the second device group. The fourth network device and the third network device may be a same network device, or may be different network devices. The fourth device group is any device group other than the first device group and the second device group in the dragonfly network. The fourth device group and the third device group may be a same device group, or may be different device groups. With reference to the example in step 201, the third network device may be a network device C2, a network device C3, a network device C4, or a network device C5. The fourth device group is a device group A.

Step 210: The first network device uses, as the target forwarding path, any non-shortest intra-group bypass path on which congestion does not occur between the first network device and the second network device.

Optionally, the first network device may separately perform congestion determining on all non-shortest intra-group bypass paths between the first network device and the second network device, and then randomly select, as the target forwarding path, one of the non-shortest intra-group bypass paths on which congestion does not occur between the first network device and the second network device. Alternatively, the first network device may sequentially perform congestion determining on the non-shortest intra-group bypass path between the first network device and the second network device, stop determining after obtaining the non-shortest intra-group bypass path on which congestion does not occur, and use, as the target forwarding path, the non-shortest intra-group bypass path on which congestion does not occur.

In the dragonfly network shown in FIG. 1, there are four non-shortest intra-group bypass paths between the network device C1 and the network device B5: the network device C1→the network device C2→the network device A4→the network device B4→the network device B5; the network device C1→the network device C3→the network device A3→the network device B3→the network device B5; the network device C1→the network device C4→the network device A2→the network device B2→the network device B5; and the network device C1→the network device C5→the network device A1→the network device B1→the network device B5.

Step 211: The first network device sends, to the second terminal device through the target forwarding path, a second packet obtained based on the first packet.

Optionally, when the target forwarding path is the shortest intra-group bypass path, the first network device adds a first indication to the first packet to obtain the second packet, and sends the second packet to the second network device through the target forwarding path, where the first indication indicates that a forwarding path type is the shortest intra-group bypass path. Alternatively, when the target forwarding path is the non-shortest intra-group bypass path, the first network device adds a second indication to the first packet to obtain the second packet, and sends the second packet to the second network device through the target forwarding path, where the second indication indicates that a forwarding path type is the non-shortest intra-group bypass path.

When the first network device selects the shortest intra-group bypass path or the non-shortest intra-group bypass path, the first network device needs to forward a packet through another network device in the first device group. Regardless of whether the first network device selects the shortest intra-group bypass path or the non-shortest intra-group bypass path, if a same network device in the first device group is used to forward a packet, local interfaces used by the network device to receive the packet are the same. Therefore, the network device needs to distinguish which packets in the packets received from the local interface that pass through the shortest intra-group bypass path, and which packets pass through the non-shortest intra-group bypass path, so that a corresponding forwarding path is used to forward the packet. In embodiments of this application, a source network device adds a first indication to the packet that passes through the shortest intra-group bypass path, and adds a second indication to the packet that passes through the non-shortest intra-group bypass path, to clearly indicate a forwarding path used by another network device that forwards the packet in the device group to forward the packet. In this way, the another network device may learn, based on the indication in the packet, that the packet should be forwarded through which global interface, to improve packet forwarding efficiency.

Optionally, the first indication and the second indication may be different differentiated services code point (differentiated services code point, DSCP) coding values, or may be different virtual local area network (virtual local area network, VLAN) priorities, or may be different 802.1p tags, or the like. The first indication and the second indication may be specifically pre-allocated by a network management person, and a type that is indicated is not limited in embodiments of this application. For example, when the VLAN priority indicates a forwarding path type, a VLAN 10 may indicate that the forwarding path type is the shortest intra-group bypass path, and a VLAN 20 may indicate that the forwarding path type is the non-shortest intra-group bypass path.

Optionally, when the target forwarding path is the local non-shortest direct-connected path, the first network device directly sends a first packet to the second terminal device through the target forwarding path. In other words, the second packet in step 211 is the first packet in step 201.

In the packet forwarding method provided in embodiments of this application, the shortest inter-group path is divided into the local shortest direct-connected path and the shortest intra-group bypass path, and/or the non-shortest inter-group path is divided into the local non-shortest direct-connected path and the non-shortest intra-group bypass path, so that the source network device may select a path at a finer granularity, to implement fine control on a packet forwarding path, and accurately control a low delay and a high throughput of packet forwarding. In addition, when selecting a path, the source network device follows a principle of preferentially selecting a shortest inter-group path, and then selecting a non-shortest inter-group path after congestion occurs on all shortest inter-group paths. In addition, the first network device preferentially selects a local shortest direct-connected path when selecting a forwarding path from the shortest inter-group path, and preferentially selects a local non-shortest direct-connected path when selecting a forwarding path from the non-shortest inter-group path. This may reduce a packet forwarding delay as much as possible, and a local direct-connected path may be preferentially selected. The source network device may better sense a local congestion condition in real time, and subsequently determine, based on the local congestion condition, whether to switch a path, so that a path switching occasion may be determined more accurately.

A sequence of steps of the packet forwarding method provided in embodiments of this application may be properly adjusted, and steps may also be correspondingly added or reduced based on a situation. Any variation method readily figured out by a person skilled in the art within the technical scope disclosed in this application shall fall within the protection scope of this application.

Optionally, step 201 to step 211 may be performed by a forwarding chip in the first network device. In other words, the forwarding chip performs congestion determining on the forwarding path, and selects a proper forwarding path based on a determining result to forward the packet. Alternatively, step 201 to step 211 may be performed by the forwarding chip in the first network device in collaboration with a coprocessor. After the forwarding chip receives the packet, the coprocessor performs congestion determining on the forwarding path, and selects a proper forwarding path based on a determining result. Then, the forwarding chip forwards the packet based on the forwarding path selected by the coprocessor.

In embodiments of this application, communication between network devices in the dragonfly network is implemented based on a 3-layer forwarding technology. Each network device needs to maintain a routing and forwarding table, to implement packet forwarding.

Optionally, the first network device obtains the routing and forwarding table, where the routing and forwarding table includes a routing prefix table and a plurality of ECMP group tables. Each entry in the routing prefix table includes a correspondence between a destination IP address and a group index of a destination device group. The group index of the destination device group is associated with one ECMP group table, the ECMP group table includes an outbound interface corresponding to each path from the first network device to the destination device group, and the destination device group is a device group in which an access device of a terminal device to which a corresponding destination IP address belongs is located. During actual application, each entry in the routing prefix table correspondingly stores one IP address and one group index. An IP address in one entry is an IP address (namely, a destination IP address) of a destination terminal device, and a group index is a group index of a device group (namely, a destination device group) in which an access device of the destination terminal device is located.

For example, in the dragonfly network shown in FIG. 1, an IP address of a terminal device S2 is 20.1.1.1/24, an IP address of a terminal device S3 is 20.1.2.1/24, and a group index of a device group B is 100. In this case, a routing prefix table stored in the network device C1 may be shown in Table 2.

TABLE 2

| IP address | Group index |
| --- | --- |
| 20.1.1.1/24 | 100 |
| 20.1.2.1/24 | 100 |
| ... | ... |

Referring to Table 2, because both the terminal device S2 and the terminal device S3 are connected to the device group B, in the routing prefix table, both a packet whose destination address is the IP address of the terminal device S2 and a packet whose destination address is the IP address of the terminal device S3 are indexed to an ECMP group table associated with the device group B.

Optionally, in addition to an outbound interface corresponding to each path from the first network device to the destination device group, the ECMP group table may further include a local congestion degree and a remote congestion degree that correspond to each outbound interface. The local congestion degree refers to a congestion degree of a local outbound interface. The remote congestion degree refers to a congestion degree of a packet sent through the local outbound interface on an outbound interface corresponding to another network device in the device group. The shortest intra-group bypass path and the non-shortest intra-group bypass path correspond to the local congestion degree and the remote congestion degree. The local shortest direct-connected path and the local non-shortest direct-connected path correspond to only the local congestion degree.

For example, in the dragonfly network shown in FIG. 1, a network device C1 is connected to a network device A5 through a global interface GE 7, connected to a network device B1 through a global interface GE 8, connected to a network device C2 through a local interface GE 3, connected to a network device C3 through a local interface GE 4, connected to a network device C4 through a local interface GE 5, and connected to a network device C5 through a local interface GE 6. A network device C2 is connected to a network device A4 through the global interface GE 7, and is connected to a network device B2 through the global interface GE 8. A network device C3 is connected to a network device A3 through the global interface GE 7, and is connected to a network device B3 through the global interface GE 8. A network device C4 is connected to a network device A2 through the global interface GE 7, and is connected to a network device B4 through the global interface GE 8. A network device C5 is connected to a network device A1 through the global interface GE 7, and is connected to a network device B5 through the global interface GE 8. If a latest congestion state of each interface of the network device C1 and a latest congestion state of the global interface of another network device in the device group B that are stored in the network device C1 are shown in Table 1, the ECMP group table that is associated with the device group B and that is stored in the network device C1 may be shown in Table 3.

TABLE 3

| Group index | Outbound interface | VLAN | Outbound interface role | Local congestion degree | Remote congestion degree |
| --- | --- | --- | --- | --- | --- |
| 100 | GE 7 | / | non-min 1 | 1 | / |
| | GE 8 | / | min 1 | 1 | 1 |
| | GE 3 | 10 | min 2 | 1 | 2 |
| | GE 4 | 10 | min 2 | 1 | 1 |
| | GE 5 | 10 | min 2 | 2 | 2 |
| | GE 6 | 10 | min 2 | 1 | 1 |
| | GE 3 | 20 | non-min 2 | 2 | 1 |
| | GE 4 | 20 | non-min 2 | 1 | 2 |
| | GE 5 | 20 | non-min 2 | 2 | 2 |
| | GE 6 | 20 | non-min 2 | 1 | 1 |

An outbound interface role "min 1" corresponds to the local shortest direct-connected path, an outbound interface role "min 2" corresponds to the shortest intra-group bypass path, an outbound interface role "non-min 1" corresponds to the local non-shortest direct-connected path, and an outbound interface role "non-min 2" corresponds to the non-shortest intra-group bypass path.

In embodiments of this application, the network device stores, by using a routing prefix table in combination with an ECMP group table, a route to each terminal device, and may store, by using one ECMP group table, all forwarding information corresponding to an IP address of a terminal device that accesses a same device group. This may save entry resources.

Optionally, the ECMP group table includes a first routing subtable and a second routing subtable. The first routing subtable and the second routing subtable may be associated with a same routing prefix table, or may be separately associated with one routing prefix table. Entry content of the routing prefix table associated with the first routing subtable is usually the same as entry content of the routing prefix table associated with the second routing subtable.

The first routing subtable includes an outbound interface corresponding to each path from the first network device to the destination device group, and the first routing subtable is used by the first network device to forward a packet from a terminal device accessing the first device group. In other words, when the first network device is located in the source device group, the first network device forwards the packet based on the first routing subtable.

Optionally, after the first network device receives, through the access interface, the packet sent by the terminal device connected to the first network device, the first network device may sequentially determine, based on the first routing subtable, whether congestion occurs on the local shortest direct-connected path, the shortest intra-group bypass path, the local non-shortest direct-connected path, and the non-shortest intra-group bypass path, until a non-congestion path is obtained, and then forward the packet through a corresponding outbound interface. After the first network device receives, through a local interface, a packet that is sent by another network device in the first device group and that is from a terminal device connected to the another network device, the first network device determines, based on an indication in the packet, whether the packet passes through the shortest intra-group bypass path or the non-shortest intra-group bypass path, and then forwards the packet by using a corresponding outbound interface.

The first routing subtable may be shown in Table 3. After receiving the packet whose destination address is 20.1.1.1/24 (the IP address of the terminal device S2) from the terminal device S1, the network device C1 first obtains Table 3 based on an index in Table 2. Because congestion does not occur on the outbound interface GE 8 corresponding to the outbound interface role "min 1", to be specific, congestion does not occur on the local shortest direct-connected path, the network device C1 directly forwards the packet through the interface GE 8.

The second routing subtable includes an outbound interface corresponding to a shortest inter-group path from the first network device to the destination device group, and the second routing subtable is used by the first network device to forward a packet from a terminal device accessing a device group other than the first device group. In other words, when the first network device is located in an intermediate device group or a destination device group, the first network device forwards the packet based on the second routing subtable. In other words, the first network device forwards the packet by using a shortest path algorithm, so that a routing loop may be avoided.

Optionally, after the first network device receives the packet from the another device group through the global interface, the first network device determines, based on the second routing subtable, a corresponding outbound interface to forward the packet. For example, the second routing subtable may be shown in Table 4.

TABLE 4

| Group index | Outbound interface | Outbound interface role | Local congestion degree |
| --- | --- | --- | --- |
| 100 | GE 8 | min 1 | 1 |
|  | GE 3 | min 2 | 1 |
|  | GE 4 | min 2 | 1 |
|  | GE 5 | min 2 | 2 |
|  | GE 6 | min 2 | 1 |

For meanings of entries in Table 4, refer to related descriptions of Table 3. Details are not described herein again in embodiments of this application.

In embodiments of this application, the routing and forwarding table may be generated through a distributed routing protocol or a central control scheme.

In a first implementation, the distributed routing protocol is used between network devices to perform routing synchronization, and local routing and forwarding tables are separately generated based on a unified policy configuration. Network devices in the same device group may use an interior Border Gateway Protocol (iBGP) to advertise routing information. In other words, the intra-group interconnection link runs the iBGP. Network devices in different device groups may use an external Border Gateway Protocol (eBGP) to advertise routing information. In other words, the inter-group interconnection link runs the eBGP. Each device group corresponds to one AS number.

In this implementation, a process in which the first network device obtains a routing and forwarding table includes: When the first network device receives a first routing message, and an AS-path attribute of the first routing message includes only one AS number, the first network device adds a forwarding entry obtained based on the first routing message to each of the first routing subtable and the second routing subtable. When the first network device receives a second routing message, and an AS-path attribute of the second routing message includes two AS numbers, the first network device adds a forwarding entry obtained based on the second routing message to only the first routing subtable.

For example, in the dragonfly network shown in FIG. 1, AS numbers 100 are configured for all network devices A1 to A5 in a device group A, AS numbers 101 are configured for all network devices B1 to B5 in a device group B, and AS numbers 102 are configured for all network devices C1 to C5 in a device group C.

The network device B5 in the device group B advertises, through the eBGP, a routing message that includes an IP address (20.1.1.1/24) of the terminal device S2. An AS-path attribute in the routing message carries the AS number 101, and the routing message is advertised to all network devices in the device group A and the device group C. For example, after the network device C1 receives the routing message through the eBGP, because the AS-path attribute of the routing message includes only one AS number 101, the network device C1 uses the route as the local shortest direct-connected path, adds a correspondence between the IP address of the terminal device S2 and the group index of the device group B to the local routing prefix table, and adds corresponding forwarding entries to the first routing subtable and the second routing subtable included in the ECMP group table associated with the device group B.

Further, the network device C1 advertises, in the device group C through the iBGP, the routing message that includes the IP address of the terminal device S2. After the network devices C2 to C5 receive the routing message through the iBGP, because the AS-path attribute of the routing message includes only one AS number 101, the network devices C2 to C5 use the route as the shortest intra-group bypass path, adds a correspondence between the IP address of the terminal device S2 and the group index of the device group B to the local routing prefix table, and separately adds corresponding forwarding entries to the first routing subtable and the second routing subtable included in the ECMP group table associated with the device group B.

In addition, the network device C1 adds the AS number 102 of the network device C1 to the AS-path attribute of the received routing message, and then continues to advertise, to the device group A through the eBGP, a routing message that includes the IP address of the terminal device S2. The AS-path attribute in the routing message carries the AS number 101 and the AS number 102, and the routing message is advertised to all network devices in the device group A. For example, after the network device A5 receives the routing message through the eBGP, because the AS-path attribute of the routing message includes the AS number 101 and the AS number 102, the network device A5 uses the route as the local non-shortest direct-connected path, adds a correspondence between the IP address of the terminal device S2 and the group index of the device group B to the local routing prefix table, and adds corresponding forwarding entries to the first routing subtable included in the ECMP group table associated with the device group B.

Still further, the network device A5 advertises, in the device group A through the iBGP, the routing message that includes the IP address of the terminal device S2. After the network devices A1 to A4 receive the routing message through the iBGP, because the AS-path attribute of the routing message includes the AS number 101 and the AS number 102, the network devices A1 to A4 use the route as a non-shortest intra-group bypass path, adds a correspondence between the IP address of the terminal device S2 and the group index of the device group B to the local routing prefix table, and adds corresponding forwarding entries to the first routing subtable included in the ECMP group table associated with the device group B.

Finally, all the network devices in the device group A and the device group C may obtain a routing prefix table similar to Table 2, a first routing subtable similar to Table 3, and a second routing subtable similar to Table 4.

In a second implementation, a routing and forwarding table is generated through a central control scheme. All network devices in the dragonfly network are controlled and managed by the control device in a unified manner. The control device stores a networking topology of the dragonfly network, IP addresses of terminal devices connected to all the network devices, and the like. When the IP address of the terminal device connected to the network device changes or link state information of the network device changes, the network device may report changed information to the control device, so that the control device updates stored information based on the updated information. The control device may be, for example, a software-defined networking (SDN) controller.

Optionally, the control device may send, to all network devices, the networking topology of the dragonfly network and an IP address of a terminal device connected to each network device, and all the network devices separately calculate, based on a unified routing algorithm, a forwarding path to a terminal device connected to another network device, to generate a corresponding routing and forwarding table. For example, the first network device may generate the routing prefix table and the plurality of ECMP group tables based on the networking topology of the dragonfly network, an IP address of a terminal device accessing the dragonfly network, and an access device of the terminal device.

Alternatively, the control device may generate, based on the networking topology of the dragonfly network, an IP address of a terminal device accessing the dragonfly network, and an access device of the terminal device, a routing and forwarding table corresponding to each network device, and send the corresponding routing and forwarding table to the network device. For example, the first network device may receive the routing and forwarding table sent by the control device.

Figure 3:
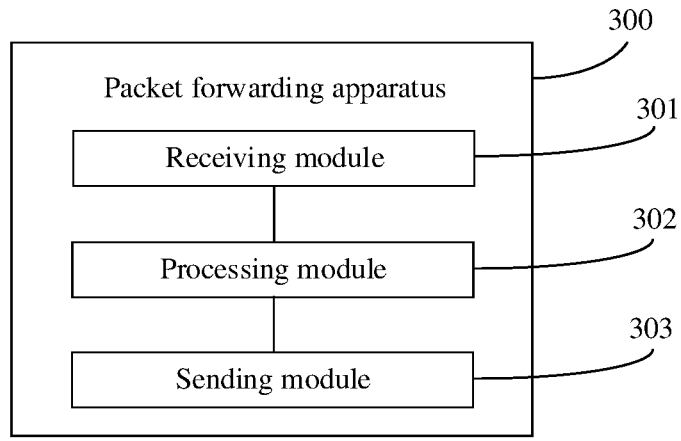
FIG. 3 is a schematic diagram of a structure of a packet forwarding apparatus according to an embodiment of this application.

The first network device configured to perform the method shown in FIG. 2A and FIG. 2B may be the packet forwarding apparatus 300 shown in FIG. 3. The packet forwarding apparatus 300 is applied to the network device in the dragonfly network. The dragonfly network includes a plurality of device groups, and there are a plurality of inter-group interconnection links between different device groups. As shown in FIG. 3, the apparatus 300 includes:

a receiving module 301, configured to receive a first packet sent by a first terminal device connected to the first network device, where a destination address of the first packet is an IP address of a second terminal device connected to a second network device, the first network device belongs to a first device group, and the second network device belongs to a second device group;

a processing module 302, configured to: when a first inter-group interconnection link exists between the first network device and the second device group, determine whether congestion occurs on the first inter-group interconnection link; and a sending module 303, configured to: when congestion does not occur on the first inter-group interconnection link, send the first packet to the second network device through the first inter-group interconnection link.

Optionally, the processing module 302 is configured to determine based on a congestion state of a global interface that is on the first network device and that is connected to the second device group, whether congestion occurs on the first inter-group interconnection link.

Optionally, the processing module 302 is further configured to: when congestion occurs on the first inter-group interconnection link, or an inter-group interconnection link does not exist between the first network device and the second device group, sequentially perform congestion determining on a shortest intra-group bypass path, a local non-shortest direct-connected path, and a non-shortest intra-group bypass path between the first network device and the second network device until a target forwarding path is obtained. The sending module 303 is further configured to send a second packet obtained based on the first packet to the second network device through the target forwarding path. The shortest intra-group bypass path includes an intra-group interconnection link between the first network device and a third network device in the first device group and an inter-group interconnection link between the third network device and the second device group, the local non-shortest direct-connected path includes an inter-group interconnection link between the first network device and a third device group and an inter-group interconnection link between the third device group and the second device group, and the non-shortest intra-group bypass path includes an intra-group interconnection link between the first network device and a fourth network device in the first device group, an inter-group interconnection link between the fourth network device and a fourth device group, and an inter-group interconnection link between the fourth device group and the second device group.

Optionally, the processing module 302 is configured to perform congestion determining on the shortest intra-group bypass path between the first network device and the second network device; and when the shortest intra-group bypass path on which congestion does not occur exists between the first network device and the second network device, use, as the target forwarding path, any shortest intra-group bypass path on which congestion does not occur between the first network device and the second network device; or when the shortest intra-group bypass path on which congestion does not occur does not exist between the first network device and the second network device, perform congestion determining on the local non-shortest direct-connected path between the first network device and the second network device; and when the local non-shortest direct-connected path on which congestion does not occur exists between the first network device and the second network device, use, as the target forwarding path, any local non-shortest direct-connected path on which congestion does not occur between the first network device and the second network device; or when the local non-shortest direct-connected path on which congestion does not occur does not exist between the first network device and the second network device, perform congestion determining on the non-shortest intra-group bypass path between the first network device and the second network device; and when the non-shortest intra-group bypass path on which congestion does not occur exists between the first network device and the second network device, use, as the target forwarding path, any non-shortest intra-group bypass path on which congestion does not occur between the first network device and the second network device.

Optionally, the processing module 302 is configured to determine, based on a queue depth of a first outbound interface queue of a local interface that is on the first network device and that is connected to the third network device and a congestion state of a global interface that is on the third network device and that is connected to the second device group, whether congestion occurs on the shortest intra-group bypass path that is between the first network device and the second network device and that passes through the third network device, where the first outbound interface queue is used to forward a packet that is in the first network device and that is forwarded through the shortest intra-group bypass path.

Optionally, the processing module 302 is configured to determine based on a congestion state of a global interface that is on the first network device and that is connected to the third device group, whether congestion occurs on the local non-shortest direct-connected path that is between the first network device and the second network device and that passes through the third device group.

Optionally, the processing module 302 is configured to determine, based on a queue depth of a second outbound interface queue of a local interface that is on the first network device and that is connected to the fourth network device and a congestion state of a global interface that is on the fourth network device and that is connected to the fourth device group, whether congestion occurs on the non-shortest intra-group bypass path that is between the first network device and the second network device and that passes through the fourth network device and the fourth device group, where the second outbound interface queue is used to forward a packet that is in the first network device and that is forwarded through the non-shortest intra-group bypass path.

Optionally, the sending module 303 is configured to: when the target forwarding path is the shortest intra-group bypass path, add, a first indication to the first packet to obtain the second packet, and send the second packet to the second network device through the target forwarding path, where the first indication indicates that a forwarding path type is the shortest intra-group bypass path; or when the target forwarding path is the non-shortest intra-group bypass path, add a second indication to the first packet to obtain the second packet, and send the second packet to the second network device through the target forwarding path, where the second indication indicates that a forwarding path type is the non-shortest intra-group bypass path.

Figure 4:
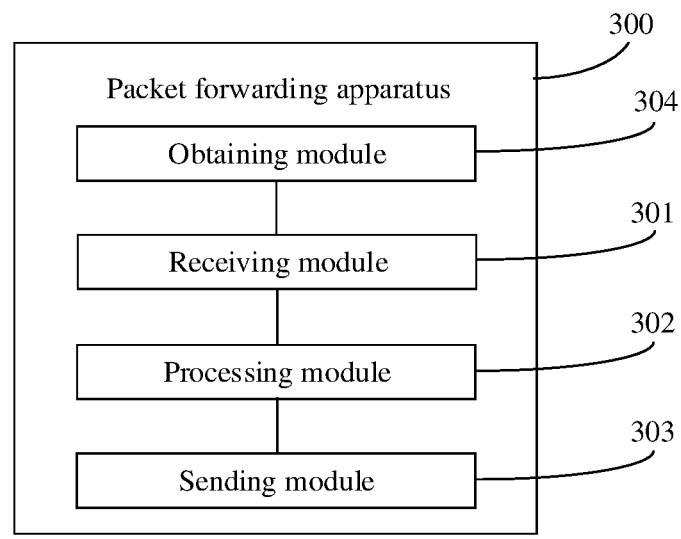
FIG. 4 is a schematic diagram of a structure of another packet forwarding apparatus according to an embodiment of this application.

Optionally, as shown in FIG. 4, the apparatus 300 further includes: an obtaining module 304, configured to obtain, a routing and forwarding table, where the routing and forwarding table includes a routing prefix table and a plurality of ECMP group tables. Each entry of the routing prefix table includes a correspondence between a destination IP address and a group index of a destination device group, the group index is associated with one ECMP group table, the ECMP group table includes an outbound interface corresponding to each path from the first network device to the destination device group, and the destination device group is a device group in which an access device of a terminal device to which the destination IP address belongs is located.

Optionally, the ECMP group table includes a first routing subtable and a second routing subtable. The first routing subtable includes an outbound interface corresponding to each path from the first network device to the destination device group, and the first routing subtable is used by the first network device to forward a packet from a terminal device accessing the first device group. The second routing subtable includes an outbound interface corresponding to a shortest inter-group path from the first network device to the destination device group, and the second routing subtable is used by the first network device to forward a packet from a terminal device accessing a device group other than the first device group.

Optionally, each device group corresponds to one AS number, and the obtaining module 304 is configured to: when the first network device receives a first routing message, and an AS-path attribute of the first routing message includes only one AS number, add, a forwarding entry obtained based on the first routing message to each of the first routing subtable and the second routing subtable; and when the first network device receives a second routing message, and an AS-path attribute of the second routing message includes two AS numbers, add, a forwarding entry obtained based on the second routing message to only the first routing subtable.

Alternatively, the obtaining module 304 is configured to generate, the routing prefix table and the plurality of ECMP group tables based on a networking topology of the dragonfly network, an IP address of a terminal device accessing the dragonfly network, and an access device of the terminal device.

Alternatively, the obtaining module 304 is configured to receive the routing and forwarding table sent by a control device.

For the apparatus in the foregoing embodiments, a specific manner in which each module performs an operation is already described in detail in the embodiments related to the method, and details are not described herein again.

Figure 5:
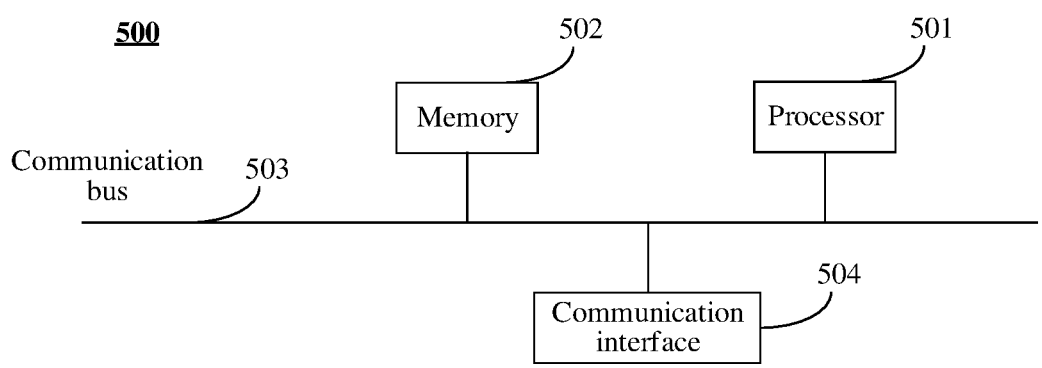
FIG. 5 is a block diagram of a network device according to an embodiment of this application.

The first network device configured to perform the method shown in FIG. 2A and FIG. 2B may be the network device 500 shown in FIG. 5. The network device 500 is a network device in a dragonfly network. The dragonfly network includes a plurality of device groups, and there are a plurality of inter-group interconnection links between different device groups. The network device 500 may be a router, a switch, or the like. As shown in FIG. 5, the network device 500 includes a processor 501 and a memory 502.

The memory 502 is configured to store a computer program, where the computer program includes program instructions.

The processor 501 is configured to invoke the computer program, to implement the actions performed by the first network device in the foregoing method embodiments.

Optionally, the network device 500 further includes a communication bus 503 and a communication interface 504.

The processor 501 includes one or more processing cores, and the processor 501 executes various function applications and data processing by running a computer program.

The memory 502 may be configured to store the computer program. Optionally, the memory may store an operating system and an application program unit required by at least one function. The operating system may be an operating system such as a real-time operating system (Real Time executive, RTX), LINUX, UNIX, Windows, or OS X.

There may be a plurality of communication interfaces 504, and the communication interface 504 is configured to communicate with, for example, a terminal device or another network device. For example, in embodiments of this application, the communication interface 504 is configured to receive and send a packet.

The memory 502 and the communication interface 504 are separately connected to the processor 501 through the communication bus 503.

Embodiments of this application further provide a computer-readable storage medium. The computer-readable storage medium stores instructions. When the instructions are executed by a processor, an action performed by the first network device in the foregoing method embodiments is implemented.

Embodiments of this application further provide a computer program product, including a computer program. When the computer program is executed by a processor, an action performed by the first network device in the foregoing method embodiments is implemented.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

In embodiments of this application, terms "first", "second" and "third" are only used to describe the objective and cannot be understood as indicating or implying relative importance.

The term "and/or" in this application only describes an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are only optional embodiments of this application, but are not intended to limit this application. Any modification, equivalent replacement, or improvement made within the spirit and principle of this application should fall within the protection scope of this application.

What is claimed is:

1. A method, applied to a dragonfly network, wherein the dragonfly network comprises a plurality of device groups, a plurality of inter-group interconnection links are between different device groups of the plurality of device groups, and the method comprises:
    receiving, by a first network device, a first packet sent by a first terminal device connected to the first network device, wherein a destination address of the first packet is an internet protocol (IP) address of a second terminal device connected to a second network device, the first network device belongs to a first device group of the plurality of device groups, and the second network device belongs to a second device group of the plurality of device groups;
    when a first inter-group interconnection link exists between the first network device and the second device group, and congestion does not occur on the first inter-group interconnection link, sending, by the first network device, the first packet to the second network device through the first inter-group interconnection link;
    when congestion occurs on the first inter-group interconnection link, or no inter-group interconnection link exists between the first network device and the second device group, sequentially performing, by the first network device, congestion determining on a shortest intra-group bypass path, a local non-shortest direct-connected path, and a non-shortest intra-group bypass path between the first network device and the second network device until a target forwarding path is obtained; and
    sending, by the first network device to the second network device through the target forwarding path, a second packet obtained based on the first packet, wherein the shortest intra-group bypass path comprises an intra-group interconnection link between the first network device and a third network device in the first device group and an inter-group interconnection link between the third network device and the second device group, the local non-shortest direct-connected path comprises an inter-group interconnection link between the first network device and a third device group and an inter-group interconnection link between the third device group and the second device group, and the non-shortest intra-group bypass path comprises an intra-group interconnection link between the first network device and a fourth network device in the first device group, an inter-group interconnection link between the fourth network device and a fourth device group, and an inter-group interconnection link between the fourth device group and the second device group.

2. The method according to claim 1, further comprising:
    determining, by the first network device based on a congestion state of a global interface that is on the first network device and that is connected to the second device group, whether congestion occurs on the first inter-group interconnection link.

3. The method according to claim 1, wherein sequentially performing, by the first network device, congestion determining on the shortest intra-group bypass path, the local non-shortest direct-connected path, and the non-shortest intra-group bypass path between the first network device and the second network device until the target forwarding path is obtained comprises:
performing, by the first network device, congestion determining on the shortest intra-group bypass path between the first network device and the second network device; and
when the shortest intra-group bypass path on which congestion does not occur exists between the first network device and the second network device, using, by the first network device as the target forwarding path, any shortest intra-group bypass path on which congestion does not occur between the first network device and the second network device;
when the shortest intra-group bypass path on which congestion does not occur does not exist between the first network device and the second network device, performing, by the first network device, congestion determining on the local non-shortest direct-connected path between the first network device and the second network device;
when congestion determining on the local non-shortest direct-connected path between the first network device and the second network device is performed, and when the local non-shortest direct-connected path on which congestion does not occur exists between the first network device and the second network device, using, by the first network device as the target forwarding path, any local non-shortest direct-connected path on which congestion does not occur between the first network device and the second network device;
when congestion determining on the local non-shortest direct-connected path between the first network device and the second network device is performed, and when the local non-shortest direct-connected path on which congestion does not occur does not exist between the first network device and the second network device, performing, by the first network device, congestion determining on the non-shortest intra-group bypass path between the first network device and the second network device; and
when congestion determining on the non-shortest intra-group bypass path between the first network device and the second network device is performed, and when the non-shortest intra-group bypass path on which congestion does not occur exists between the first network device and the second network device, using, by the first network device as the target forwarding path, any non-shortest intra-group bypass path on which congestion does not occur between the first network device and the second network device.

4. The method according to claim 3, wherein performing, by the first network device, congestion determining on the shortest intra-group bypass path between the first network device and the second network device comprises:
determining, by the first network device based on a queue depth of a first outbound interface queue of a local interface that is on the first network device and that is connected to the third network device and a congestion state of a global interface that is on the third network device and that is connected to the second device group, whether congestion occurs on the shortest intra-group bypass path that is between the first network device and the second network device and that passes through the third network device, wherein the first outbound interface queue is used to forward a packet that is in the first network device and that is forwarded through the shortest intra-group bypass path.

5. The method according to claim 3, wherein performing, by the first network device, congestion determining on the local non-shortest direct-connected path between the first network device and the second network device comprises:
determining, by the first network device based on a congestion state of a global interface that is on the first network device and that is connected to the third device group, whether congestion occurs on the local non-shortest direct-connected path that is between the first network device and the second network device and that passes through the third device group.

6. The method according to claim 3, wherein performing, by the first network device, congestion determining on the non-shortest intra-group bypass path between the first network device and the second network device comprises:
determining, by the first network device based on a queue depth of a second outbound interface queue of a local interface that is on the first network device and that is connected to the fourth network device and a congestion state of a global interface that is on the fourth network device and that is connected to the fourth device group, whether congestion occurs on the non-shortest intra-group bypass path that is between the first network device and the second network device and that passes through the fourth network device and the fourth device group, wherein the second outbound interface queue is used to forward a packet that is in the first network device and that is forwarded through the non-shortest intra-group bypass path.

7. The method according to claim 6, wherein sending, by the first network device to the second network device through the target forwarding path, the second packet obtained based on the first packet comprises:
when the target forwarding path is the shortest intra-group bypass path, adding, by the first network device, a first indication to the first packet to obtain the second packet, and sending the second packet to the second network device through the target forwarding path, wherein the first indication indicates that a forwarding path type is the shortest intra-group bypass path; or
when the target forwarding path is the non-shortest intra-group bypass path, adding, by the first network device, a second indication to the first packet to obtain the second packet, and sending the second packet to the second network device through the target forwarding path, wherein the second indication indicates that a forwarding path type is the non-shortest intra-group bypass path.

8. The method according to claim 1, further comprising:
obtaining, by the first network device, a routing and forwarding table, wherein the routing and forwarding table comprises a routing prefix table and a plurality of equal-cost multi-path (ECMP) group tables; and
wherein each entry of the routing prefix table comprises a correspondence between a destination IP address and a group index of a corresponding destination device group, the group index is associated with one ECMP group table, the one ECMP group table comprises an outbound interface corresponding to each path from the first network device to the corresponding destination device group, and the corresponding destination device group is a device group in which an access device of a terminal device to which the destination IP address belongs is located.

9. The method according to claim 8, wherein each ECMP group table comprises a first routing subtable and a second routing subtable, and wherein:
- the first routing subtable comprises an outbound interface corresponding to each path from the first network device to the corresponding destination device group, and the first routing subtable is used by the first network device to forward a packet from a terminal device accessing the first device group; and
- the second routing subtable comprises an outbound interface corresponding to a shortest inter-group path from the first network device to the corresponding destination device group, and the second routing subtable is used by the first network device to forward a packet from a terminal device accessing a device group other than the first device group.

10. An apparatus, applied to a first network device in a dragonfly network, wherein the dragonfly network comprises a plurality of device groups, a plurality of inter-group interconnection links are between different device groups, and the apparatus comprises:
- a receiver, configured to receive a first packet sent by a first terminal device connected to the first network device, wherein a destination address of the first packet is an internet protocol (IP) address of a second terminal device connected to a second network device, the first network device belongs to a first device group of the plurality of device groups, and the second network device belongs to a second device group of the plurality of device groups;
- at least one processor; and
- a non-transitory computer readable storage medium storing instructions that are executable by the at least one processor, the instructions comprising instructions to:
- when a first inter-group interconnection link exists between the first network device and the second device group, determine whether congestion occurs on the first inter-group interconnection link;
- when congestion does not occur on the first inter-group interconnection link, send the first packet to the second network device through the first inter-group interconnection link;
- when congestion occurs on the first inter-group interconnection link, or no inter-group interconnection link exists between the first network device and the second device group, sequentially performing congestion determining on a shortest intra-group bypass path, a local non-shortest direct-connected path, and a non-shortest intra-group bypass path between the first network device and the second network device until a target forwarding path is obtained; and
- sending, to the second network device through the target forwarding path, a second packet obtained based on the first packet, wherein the shortest intra-group bypass path comprises an intra-group interconnection link between the first network device and a third network device in the first device group and an inter-group interconnection link between the third network device and the second device group, the local non-shortest direct-connected path comprises an inter-group interconnection link between the first network device and a third device group and an inter-group interconnection link between the third device group and the second device group, and the non-shortest intra-group bypass path comprises an intra-group interconnection link between the first network device and a fourth network device in the first device group, an inter-group interconnection link between the fourth network device and a fourth device group, and an inter-group interconnection link between the fourth device group and the second device group.

11. The apparatus according to claim 10, wherein the instructions include instructions to determine, based on a congestion state of a global interface that is on the first network device and that is connected to the second device group, whether congestion occurs on the first inter-group interconnection link.

12. The apparatus according to claim 10, wherein the instructions include instructions to:
- perform congestion determining on the shortest intra-group bypass path between the first network device and the second network device;
- when the shortest intra-group bypass path on which congestion does not occur exists between the first network device and the second network device, use, as the target forwarding path, any shortest intra-group bypass path on which congestion does not occur between the first network device and the second network device;
- when the shortest intra-group bypass path on which congestion does not occur does not exist between the first network device and the second network device, perform congestion determining on the local non-shortest direct-connected path between the first network device and the second network device;
- when congestion determining on the local non-shortest direct-connected path between the first network device and the second network device is performed, and when the local non-shortest direct-connected path on which congestion does not occur exists between the first network device and the second network device, use, as the target forwarding path, any local non-shortest direct-connected path on which congestion does not occur between the first network device and the second network device;
- when congestion determining on the local non-shortest direct-connected path between the first network device and the second network device is performed, and when the local non-shortest direct-connected path on which congestion does not occur does not exist between the first network device and the second network device, perform congestion determining on the non-shortest intra-group bypass path between the first network device and the second network device; and
- when congestion determining on the non-shortest intra-group bypass path between the first network device and the second network device is performed, and when the non-shortest intra-group bypass path on which congestion does not occur exists between the first network device and the second network device, use, as the target forwarding path, any non-shortest intra-group bypass path on which congestion does not occur between the first network device and the second network device.

13. The apparatus according to claim 12, wherein the instructions include instructions to:
- determine, based on a queue depth of a first outbound interface queue of a local interface that is on the first network device and that is connected to the third network device and a congestion state of a global interface that is on the third network device and that is connected to the second device group, whether congestion occurs on the shortest intra-group bypass path that is between the first network device and the second network device and that passes through the third network device, wherein the first outbound interface queue is used to forward a packet that is in the first network device and that is forwarded through the shortest intra-group bypass path.

14. The apparatus according to claim 12, wherein the instructions include instructions to:
determine, based on a congestion state of a global interface that is on the first network device and that is connected to the third device group, whether congestion occurs on the local non-shortest direct-connected path that is between the first network device and the second network device and that passes through the third device group.

15. The apparatus according to claim 12, wherein the instructions include instructions to:
determine, based on a queue depth of a second outbound interface queue of a local interface that is on the first network device and that is connected to the fourth network device and a congestion state of a global interface that is on the fourth network device and that is connected to the fourth device group, whether congestion occurs on the non-shortest intra-group bypass path that is between the first network device and the second network device and that passes through the fourth network device and the fourth device group, wherein the second outbound interface queue is used to forward a packet that is in the first network device and that is forwarded through the non-shortest intra-group bypass path.

16. The apparatus according to claim 10, wherein the instructions include instructions to:
when the target forwarding path is the shortest intra-group bypass path, add a first indication to the first packet to obtain the second packet, and send the second packet to the second network device through the target forwarding path, wherein the first indication indicates that a forwarding path type is the shortest intra-group bypass path; or
when the target forwarding path is the non-shortest intra-group bypass path, add a second indication to the first packet to obtain the second packet, and send the second packet to the second network device through the target forwarding path, wherein the second indication indicates that a forwarding path type is the non-shortest intra-group bypass path.

17. The apparatus according to claim 10, wherein the instructions further include instructions to:
obtain a routing and forwarding table, wherein the routing and forwarding table comprises a routing prefix table and a plurality of equal-cost multi-path (ECMP) group tables; and
wherein each entry of the routing prefix table comprises a correspondence between a destination IP address and a group index of a destination device group, the group index is associated with one ECMP group table, each ECMP group table comprises an outbound interface corresponding to each path from the first network device to the corresponding destination device group, and the corresponding destination device group is a device group in which an access device of a terminal device to which the destination IP address belongs is located.

18. The apparatus according to claim 17, wherein each ECMP group table comprises a first routing subtable and a second routing subtable, wherein each first routing subtable comprises an outbound interface corresponding to each path from the first network device to the destination device group, and each first routing subtable is used by the first network device to forward a packet from a terminal device accessing the first device group; and
wherein each second routing subtable comprises an outbound interface corresponding to a shortest inter-group path from the first network device to the corresponding destination device group, and the second routing subtable is used by the first network device to forward a packet from a terminal device accessing a device group other than the first device group.

19. A non-transitory computer readable storage medium storing instructions that are executable by at least one processor, wherein when the instructions are executed, a first network device of a dragonfly network is caused to perform:
receiving a first packet sent by a first terminal device connected to the first network device, wherein the dragonfly network comprises a plurality of device groups, a plurality of inter-group interconnection links are between different device groups of the plurality of device groups, wherein a destination address of the first packet is an internet protocol (IP) address of a second terminal device connected to a second network device, the first network device belongs to a first device group of the plurality of device groups, and the second network device belongs to a second device group of the plurality of device groups;
when a first inter-group interconnection link exists between the first network device and the second device group, and congestion does not occur on the first inter-group interconnection link, sending the first packet to the second network device through the first inter-group interconnection link;
when congestion occurs on the first inter-group interconnection link, or no inter-group interconnection link exists between the first network device and the second device group, sequentially performing congestion determining on a shortest intra-group bypass path, a local non-shortest direct-connected path, and a non-shortest intra-group bypass path between the first network device and the second network device until a target forwarding path is obtained; and
sending, to the second network device through the target forwarding path, a second packet obtained based on the first packet, wherein the shortest intra-group bypass path comprises an intra-group interconnection link between the first network device and a third network device in the first device group and an inter-group interconnection link between the third network device and the second device group, the local non-shortest direct-connected path comprises an inter-group interconnection link between the first network device and a third device group and an inter-group interconnection link between the third device group and the second device group, and the non-shortest intra-group bypass path comprises an intra-group interconnection link between the first network device and a fourth network device in the first device group, an inter-group interconnection link between the fourth network device and a fourth device group, and an inter-group interconnection link between the fourth device group and the second device group.

20. The non-transitory computer readable storage medium according to claim 19, wherein when the instructions are executed, the first network device is caused to perform:
determining, based on a congestion state of a global interface that is on the first network device and that is connected to the second device group, whether congestion occurs on the first inter-group interconnection link.

\* \* \* \* \*